5 Sheets—Sheet 1.

L. W. STOCKWELL.
Machine for Making Metal-Screws.

No. 210,165. Patented Nov. 19, 1878.

5 Sheets—Sheet 2.

L. W. STOCKWELL.
Machine for Making Metal-Screws.

No. 210,165. Patented Nov. 19, 1878.

Witnesses
Geo. F. Robinson
J. H. Dussel

Inventor
Levi W. Stockwell
by Bradford Howland
his attorney

N. PETERS, PHOTO-LITHOGRAPHER, WASHINGTON, D.C.

5 Sheets—Sheet 3.
L. W. STOCKWELL.
Machine for Making Metal-Screws.
No. 210,165.                Patented Nov. 19, 1878.
Fig. 3
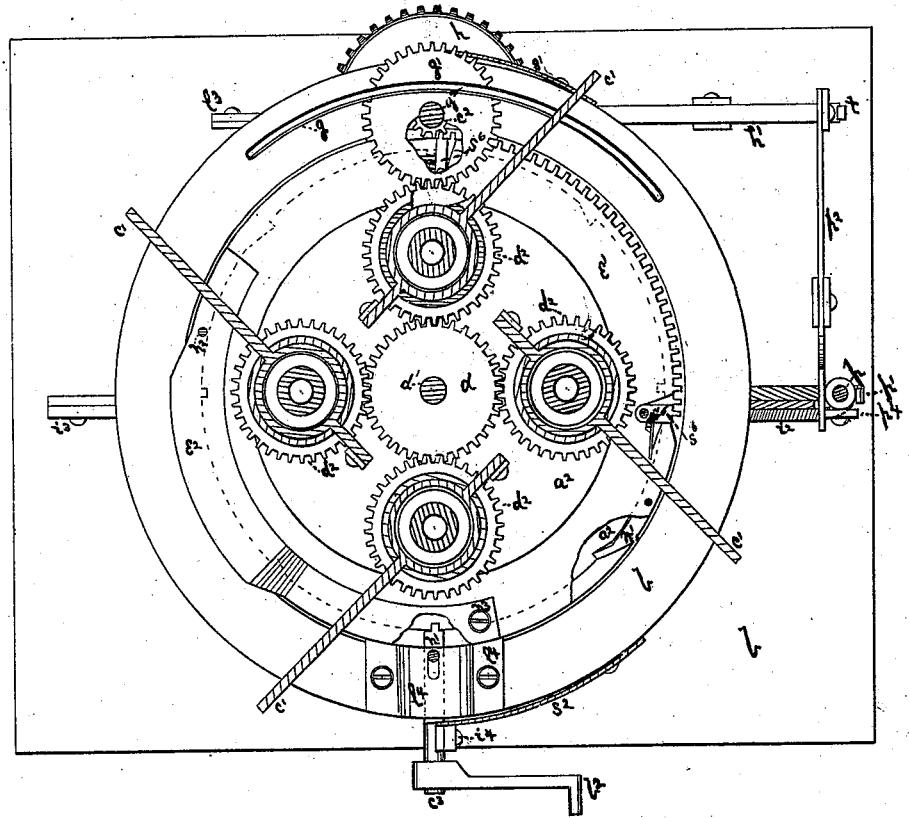
Fig. 4
Fig. 5
Witnesses
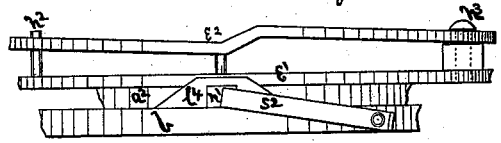
Inventor
Levi W. Stockwell
by Bradford Howland
his Attorney
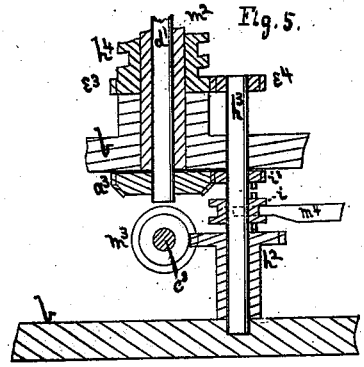

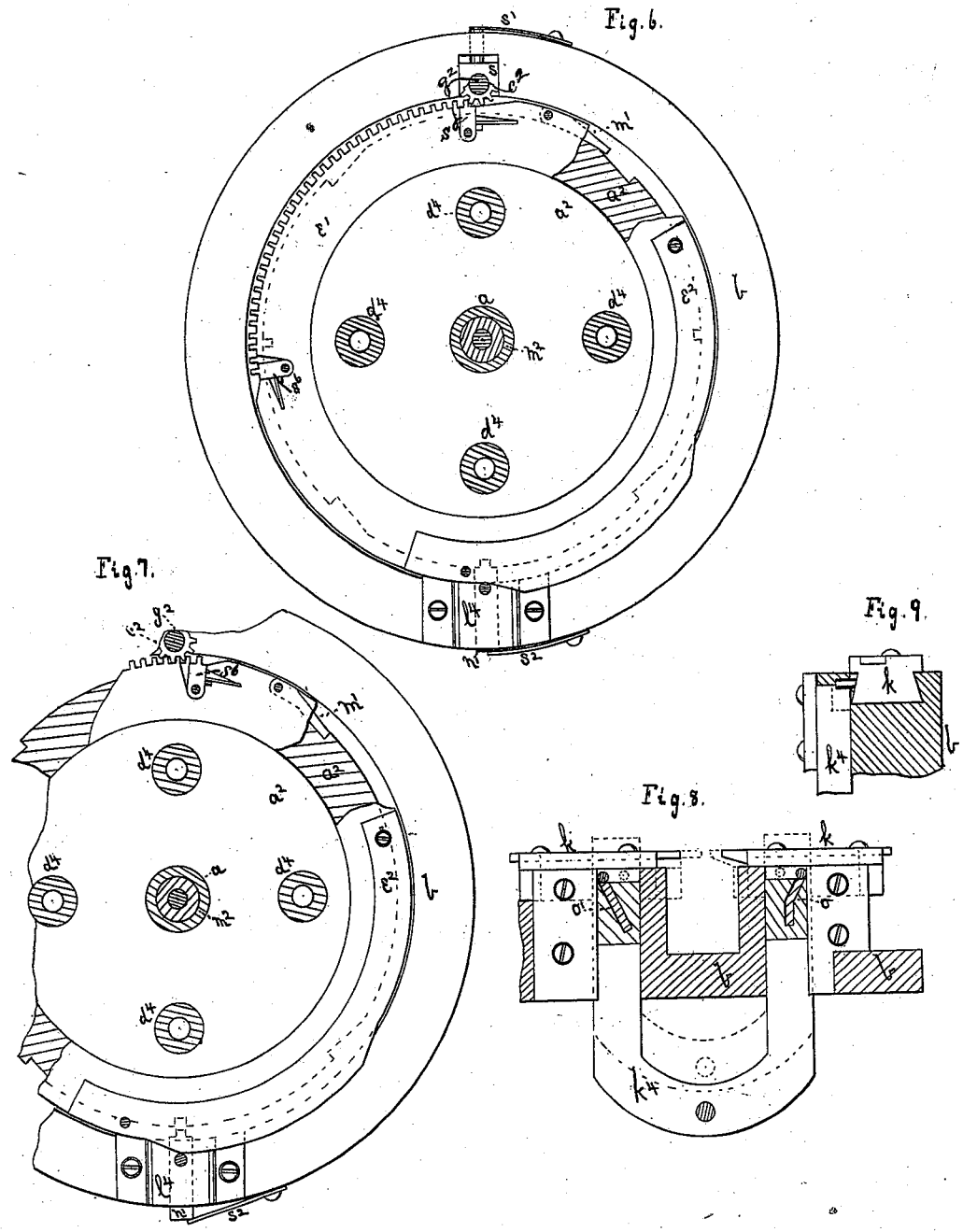

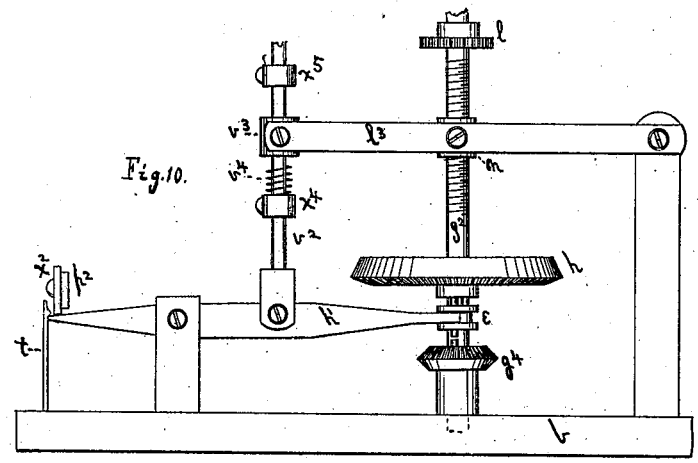
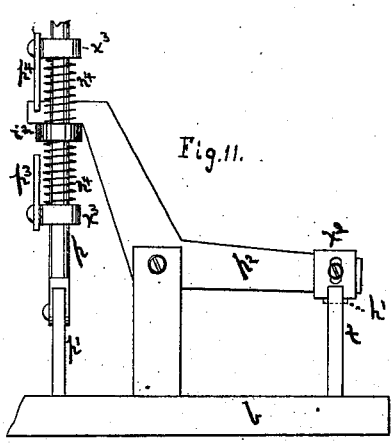
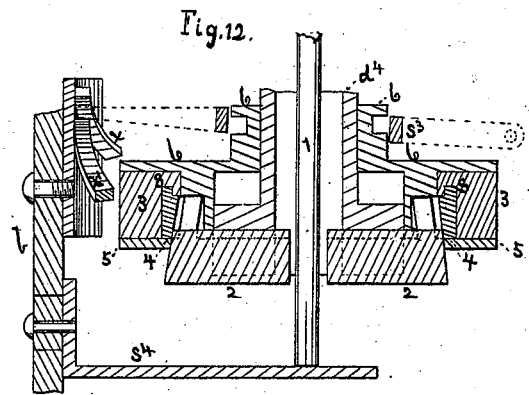
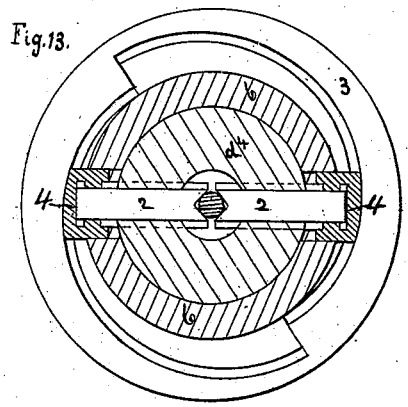
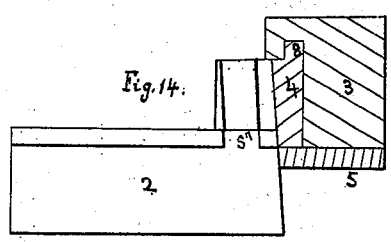

UNITED STATES PATENT OFFICE.

LEVI W. STOCKWELL, OF RAVENNA, OHIO, ASSIGNOR, BY MESNE ASSIGN-MENTS, TO JOHN C. GRANNIS, TRUSTEE FOR BRADFORD HOWLAND AND FREDERICK W. WOODBRIDGE.

IMPROVEMENT IN MACHINES FOR MAKING METAL SCREWS.

Specification forming part of Letters Patent No. 210,165, dated November 19, 1878; application filed April 28, 1877.

*To all whom it may concern:*

Be it known that I, LEVI W. STOCKWELL, of Ravenna, Portage county, Ohio, have invented a new and useful Improvement in Machines for Making Machine-Screws, which improvement is fully set forth in the following specification, reference being had to the accompanying drawings.

The object of my invention is to mill, thread, cut off, and finish the heads and points of the screws by holding the rods from which the screws are made in a series of chucks, which are moved by a chuck-carrier from one tool-holder to another until the rod has been operated upon by a series of tools, all the tools operating simultaneously upon different rods.

Figure 1:
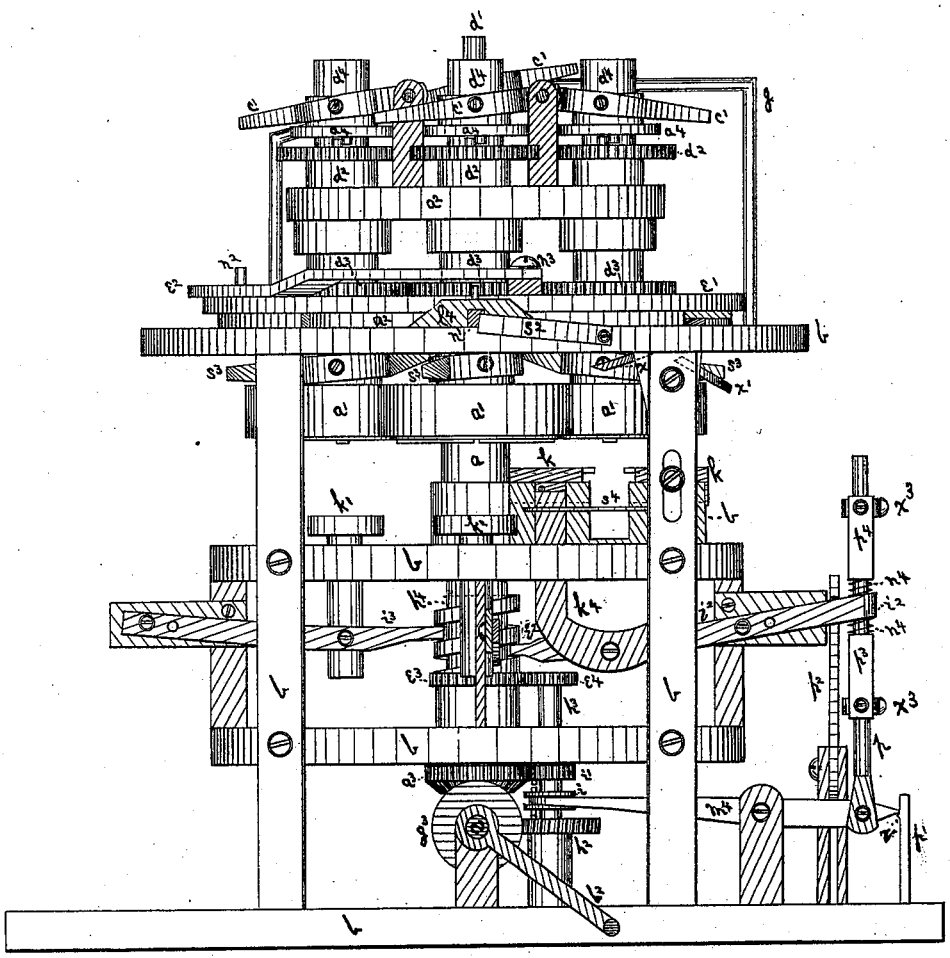
Figure 2:
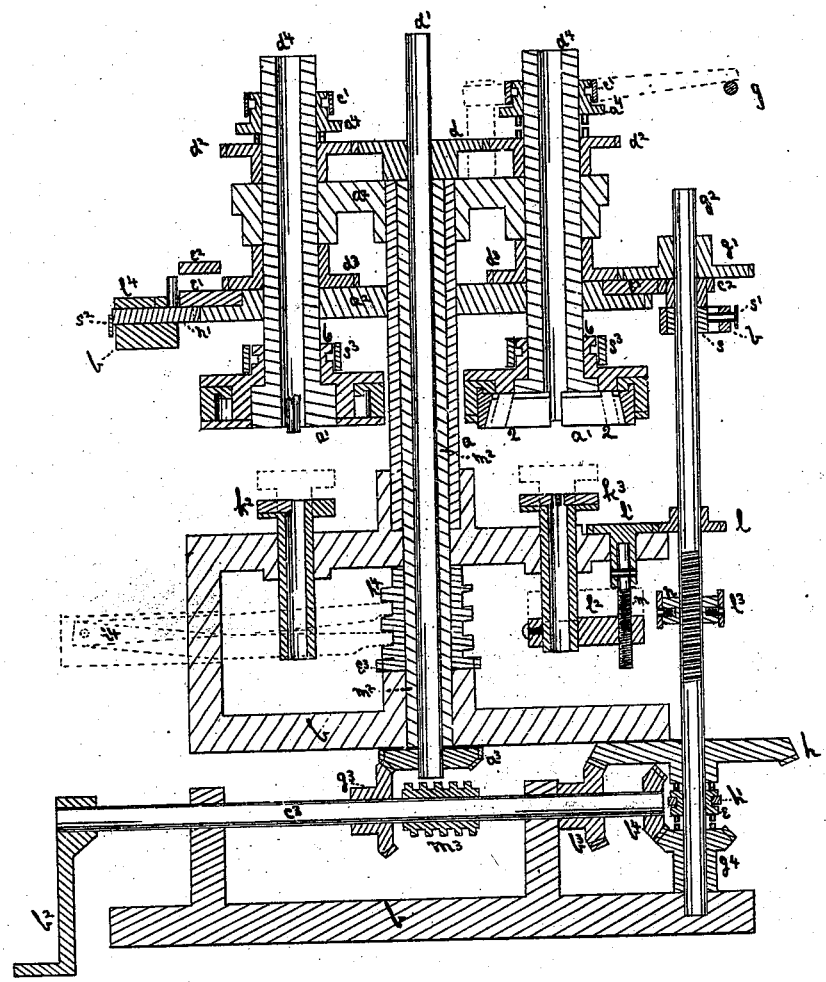

Figure 1 is a front elevation. Fig. 2 is a vertical section. Fig. 3 is a plan view of the machine. Figs. 4 to 14, inclusive, represent various detached parts.

The greater part of the frame $b$ is circular, its top being in the form of a ring. The main shaft $c^3$ is connected with the perpendicular shaft $d^1$ by the bevel-wheels $g^3$ and $a^3$. The shaft $d^1$ turns in the fixed hollow cylinder $m^2$, which is firmly attached to the frame $b$. The wheel $d$ on the shaft $d^1$ connects with wheels $d^2$ $d^2$ $d^2$ $d^2$ on the hollow spindles $d^4$ $d^4$ $d^4$ $d^4$ of the chucks $a^1$ $a^1$ $a^1$ $a^1$. The wheels $d^2$ are loose on the spindles $d^4$, but turn them and the chucks $a^1$ by means of the clutches $a^4$ $a^4$ $a^4$ $a^4$, which slide on the spindles. The chuck-spindles $d^4$ turn in a chuck carrier, $a^2$, formed of two circular plates, one above the other, and both firmly attached to a third part, $a$, which is a hollow shaft surrounding the cylinder $m^2$ and supported by the frame $b$. Between the circular plates of the chuck-carrier $a^2$ are the wheels $d^3$ $d^3$ $d^3$ $d^3$, attached to the chuck-spindles $d^4$. The wheels $d^3$ are alternately in connection with the wheel $g^1$ on the shaft $g^2$ at each quarter-revolution of the carrier $a^2$, the motion of which is intermittent. When wheel $d^3$ is in connection with wheel $g^1$ the lever $c^1$, attached to the clutch $a^4$, is raised by the cam $g$, thereby throwing wheel $d^2$ out of clutch, so that it turns loose on the spindle $d^4$. The cam $g$ is attached to the frame $b$, and lifts the lever $c^1$ when the chuck-carrier $a^2$ is turning, and just before the wheel $d^3$ connects with the wheel $g^1$. Each of the levers $c^1$ $c^1$ $c^1$ $c^1$ is connected by a pin with an annular groove in the clutch $a^4$.

The intermittent motion of the chuck-carrier $a^2$ is produced by the following means: The ring $e^1$ rests in a recess or depression in the carrier $a^2$. Its circumference (one-fourth of which is toothed) is somewhat greater than that of the carrier. Its toothed part connects with the wheel $c^2$ on the shaft $g^2$. The wheel $c^2$ rotates alternately in opposite directions, and thereby gives an intermittingly rotary motion alternately in opposite directions to the ring $e^1$. A slip-tooth, $s^6$, at each end of the toothed part of the ring $e^1$, enables the wheel $c^2$, whenever its motion is reversed, to connect with the teeth on the ring $e^1$. Attached to the bottom of the ring $e^1$, at its circumference, is a spring-pawl, $m^1$, Fig. 3, which enters alternately four notches, equally distant from each other, in the circumference of the carrier $a^2$, and thereby, when the ring $e^1$ is turned forward, moves the carrier $a^2$ a quarter of a revolution. There are four other notches in the circumference of the carrier $a^2$, equally distant from each other, into which, alternately, the stop $n^1$, Fig. 3, enters when the carrier $a^2$ has made a quarter-revolution. The stop $n^1$ firmly holds the carrier $a^2$ in its position while the rods in the chucks $a^1$ $a^1$ $a^1$ $a^1$ are being operated on by the tools. The stop $n^1$ slides in the box $l^4$, attached to the top of the frame $b$, and is forced into the notches in the carrier $a^2$ by the spring $s^2$ attached to the circumference of the frame $b$. When the carrier is in the position as shown in Fig. 3, and the tools are operating on the rods held in the chucks, the motion of the wheel $c^2$ is reversed, which turns the ring $e^1$ backward on the carrier $a^2$, carrying the pawl $m^1$ out of the notch in the carrier $a^2$. The ring $e^1$ also carries with it the cam $e^2$, which is held in position on the top of the ring $e^1$ by the pins $n^2$ and $n^3$. While the ring $e^1$ is thus making its backward movement on the carrier $a^2$, which is still being held by the stop $n^1$, the cam $e^2$ is lifted, as shown in Fig. 4, by a pin projecting upward from the stop $n^1$, and forming a part of it, and passes over the stop $n^1$ without forcing it out of the notch in the carrier $a^2$.

When the backward movement of the ring $e^1$ is completed, its position, with its pawl $m^1$ and cam $e^2$, in reference to the stop $n^1$ and the notches in the carrier $a^2$, is as shown in Fig. 6. While it is again moving forward until the pawl $m^1$ enters the notch in the carrier $a^2$, Fig. 7, the cam $e^2$ forces the stop $n^1$ out of its notch in the carrier $a^2$, and then the ring $e^1$ turns forward the carrier $a^2$ a quarter of a revolution, till the stop $n^1$ is again forced into its notch in the carrier $a^2$ by the spring $s^2$, as shown in Fig. 3. The ring $e^1$ moves enough more than a quarter of a revolution to permit the cam $e^2$ to force the stop $n^1$ out of its notch in the carrier $a^2$ before the pawl $m^1$ enters its notch to move forward the carrier.

The tools are operated as follows: The tool-holders $k\,k$ carry tools for cutting off the rod held in the chuck $a^1$ and shaping the head of the screw-bolt. They have a horizontal reciprocating motion, approaching and receding from each other. The tool-holders $k^1\,k^2\,k^3$ have a perpendicularly reciprocating motion. The tools to be used in holder $k^1$ mill the rod, those in $k^2$ point it, and the dies in $k^3$ thread it, and then it is cut off from the rod and its head shaped by the cutters in the holders $k\,k$. The lower part of each tool-holder $k^1\,k^2\,k^3$ is a spindle having a vertical motion in the frame $b$.

To the lower end of the spindle of the holder $k^1$ is attached the lever $i^3$, the outer end of which turns on a pin in a projecting part of the frame $b$, and the inner end connects with the worm $h^4$. This worm is turned on the hollow cylinder $m^2$ by means of its teeth $e^3$, surrounding it at its lower end, and connecting with the wheel $e^1$ on the shaft $h^3$. The shaft $h^3$ turns in the frame $b$, and has on it the loose wheels $i^1$ and $h^2$, with the sliding clutch $i$ between them, which connects alternately with each of the wheels. The wheel $i^1$ is turned loose on its shaft by the wheel $a^3$ on the shaft $d^1$, except when wheel $i^1$ is connected with clutch $i$, and then it turns its shaft $h^3$, wheel $e^4$, and worm $h^4$. The worm-wheel $h^2$ connects with the worm $m^3$, Fig. 5, on the main shaft, and turns the shaft $h^3$ and worm $h^4$, when it connects with the clutch $i$, as shown in Fig. 1. It turns the worm $h^4$ so as to raise the tool-holders $k^1\,k^2$ by means of the levers $i^3$ and $i^4$, while the tools are operating on the rods held in the chucks $a^1$, except while finishing the operation. The levers $i^3\,i^4$ rest on the horizontal top of the worm $h^4$, causing the tools to remain stationary while finishing their work. The horizontal top of the thread of the worm is shown in Fig. 2, and by the dotted line in Fig. . When this is accomplished the clutch $i$ connects with the wheel $i^1$, which rapidly reverses the motion of the worm $h^4$, lowering the levers $i^3\,i^4$ and the tool-holders $k^1\,k^2$, and thus withdraws the tools from the rods. The lever connects with the worm $h^4$, and also with a cam, $k^4$, which moves the tool-holders $k\,k$ by the contact of the sides of the cam-grooves $o\,o^1$ with a pin in the side of each holder, as shown in Fig. 8. When the lever $i^2$ is raised by the worm $h^4$ the cam $k^4$ forces the holders $k\,k$ toward each other to cut off the rod held in chuck $a^1$ and shape the screw-head, and causes them to recede when the lever $i^2$ is lowered by the worm $h^4$. The tool-holders $k\,k$ are held and slide in the frame $b$.

The cam-groove $o$, which operates the beveling-tool for shaping the screw-head, and the cam-groove $o^1$, which operates the cutting-off tool, converge downward; but only a part of cam-groove $o$ converges, the remainder being vertical, and causing the beveling-tool to remain stationary while finishing the shaping of the screw-head.

A part of cam $k^4$, Fig. 8, is represented as a section, so as to show the cam-grooves $o\,o^1$. A cross-section of one side of the cam $k^4$ and the tool-holder $k$ and connecting parts is shown in Fig. 9.

The tool-holder $k^3$, Fig. 2, which carries the threading-dies, is raised and lowered by means of the nut $l^2$ on the screw $m$, one side of the nut being firmly attached to the spindle of the holder $k^3$. The screw $m$ is held in the hub of the wheel $l^1$, which connects with wheel $l$. The ratio of the diameters of wheels $g^1$ and $d^3$ is the same as that of wheels $l$ and $l^1$.

As the thread to be cut on the rod held in the chuck $a^1$ will correspond with the thread of the screw $m$, the screw and the nut $l^2$ are made removable, so that a nut and screw of any desirable thread may be substituted in their places.

The wheel $l^1$ has an intermittent rotation in opposite directions, which is more rapid when lowering the tool-holder $k^3$ to withdraw the threading-dies from the rod. This motion is produced by means of the clutch $e$ on the shaft $g^2$. The clutch $e$ slides on its shaft, and connects alternately with the loose wheels $h$ and $g^4$, which connect with wheels $b^3$ and $b^4$ on the main shaft $c^3$.

When the clutch $e$ connects with wheel $h$, the wheel $c^2$ on the shaft $g^2$ moves forward the chuck-carrier $a^2$ a quarter of a revolution, in time to bring the chucks $a^1$ in position for the rods to be operated on before the approaching threading-dies in the rising tool-holder $k^3$ reach the rod, and then the threading-dies continue to rise and thread the rod. While the ring $e^1$ is being moved forward, carrying the chucks $a^1$ into position over the tools, as before stated, one of the levers $c^1$ is raised by the cam $g$, disconnecting the clutch $a^4$ from the wheel $d^2$, before the wheel $d^3$ connects with wheel $g^1$, so that while the threading-dies are operating the chuck above them is revolved by the shaft $g^2$ instead of by the shaft $d^1$.

When the clutch $e$ connects with wheel $g^4$, which is smaller than wheel $h$, the motion of wheel $l^1$ is reversed and accelerated and the threading-dies rapidly withdrawn from the rod held in chuck $a^1$, while the wheel $g^1$ reverses the motion of the connecting-wheel $d^3$ and the chuck. At the same time the ring $e^1$ is moved backward on the carrier $a^2$ by the reversed motion of wheel $c^2$.

When the threading-dies have finished their work and withdrawn from the screw-bolt, the other tools have not ceased operating, and therefore when the clutch $e$ is disconnected from wheel $g^4$, and before connecting with wheel $h$, it is caused to remain suspended between the two wheels $h$ and $g^4$, thereby stopping the motion of shaft $g^2$ until the milling, pointing, and cutting-off tools have finished their work. The cause of this suspension of clutch $e$ will be hereinafter explained.

The wheel $g^1$, with the upper part of its shaft $g^2$, is permitted to have a slight lateral or oscillating movement, to aid the wheels $d^3$ and $g^1$ in making connection with each other, when the carrier $a^2$ is moving forward. This is done by means of the box $s$, in which the shaft $g^2$ turns, Figs. 2 and 6, which has space in the frame $b$ to move outward against the spring $s^1$, attached to the frame, whenever the ends of the teeth in wheels $d^3$ and $g^1$ come in contact at the moment the wheels connect with each other.

There is an annular groove in the upper part of the chucks $a^1\ a^1\ a^1\ a^1$, into which pins in the levers $s^3\ s^3\ s^3\ s^3$ enter, for the purpose of opening the jaws of the chucks to release the rods by raising the levers. The inner ends of the levers $s^3$ are attached to the carrier $a^2$, and the outer ends are raised alternately by the cam $x^1$, as shown in Fig. 12. The cam $x^1$ is attached in such a position on the frame $b$ as to lift the lever $s^3$ after the screw-bolt has been cut off from the rod, and while the chuck is moving from the tool-holder $k\ k$ to the next tool-holders, $k^2$.

The cam $x$ is attached to the frame $b$ with the cam $x^1$, so that when the lever $s^3$ has been raised by the upwardly-inclined cam $x^1$ and the chuck-jaws 2 2 opened, it comes in contact with the under side of the downwardly-inclined cam $x$, which forces the lever $s^3$ down and closes the chuck-jaws 2 2 firmly against the rod. While the chuck-jaws 2 2 are open the the rod 1 drops on a gage, $s^4$, which is adjustable for any desired length of screw-bolt.

The horizontal gage $s^4$ is a thin broad piece of metal, having its shank bent upward, so as to be attached to the upright part of the frame $b$ by a screw through a slot in the frame, by which it is adjusted for the different lengths of screw-bolts to be made by the machine.

The clutch $i$, Figs. 1 and 5, is operated by the lever $m^4$, which turns on a pin in the frame $b$, and is connected at its inner end with an annular groove in the clutch $i$, and at its outer end is narrowed to nearly a horizontal edge, where it connects with the cam-spring $p^1$ attached to the frame $b$. Near its outer end the lever $m^4$ is connected by a pin with the upright rod $p$, by which it is operated. The rod $p$ passes through the outer end of the lever $i^2$, which is moved up and down on the rod $p$ by the worm $h^4$. On each side of the lever $i^2$, and surrounding the rod $p$, is a spiral spring, $n^4\ n^4$, held by adjustable collars $x^3\ x^3$ on the rod against the pressure of the lever on the springs.

The adjustable stops $p^3\ p^4$ are attached to the collars, and the lever $i^2$, after compressing the spiral spring $n^4$, presses against an end of each stop alternately, and thus raises or lowers the rod $p$ and moves the outer end of lever $m^4$ against the V-shaped cam $v$ on the cam-spring $p^1$, and thereby connects the clutch $i$ with one of the wheels $i^1\ h^2$.

The pressure of the cam-spring $p^1$ prevents the outer end of lever $m^4$ from moving over the cam $v$ until, by the movement of lever $i^2$, the pressure against one of the stops $p^3\ p^4$ moves the outer end of lever $m^4$ to the apex of cam $v$, and then the action of one of the spiral springs $n^4\ n^4$, moves the lever $m^4$ over the other part of the cam $v$, and thereby connects the clutch $i$ with one of the wheels $i^3\ h^1$.

The clutch $e$, Fig. 10, is operated by the lever $h^1$, the inner end of which connects with an annular groove in the clutch. The lever $h^1$ turns on a pin in the frame $b$, between which and the clutch it is connected by a pin with an upright rod, $v^2$, above it. The lever $h^1$ is moved by this rod, which connects with the lever $l^3$ and a nut, $n$, on a threaded part of the shaft $g^2$ between the wheels $l\ h$. The lever $l^3$ is connected by a pin with the nut $n$, and one end turns on a pin in the frame of the machine, and the other end is connected by a pin with the sliding collar $v^3$ on the rod $v^2$, between two adjustable collars, $x^4\ x^5$. The shaft $g^2$, by its intermittent motion in opposite directions, moves the nut $n$ alternately up and down on the thread of the shaft, and thereby moves the lever $l^3$ till the sliding collar $v^3$, by compressing the spring $v^4$, operates the lever $h^1$, so as to connect clutch $e$ with wheel $g^4$, and by a reverse motion of nut $n$ lifts the rod $v^2$ and lever $h^1$, so as to disconnect clutch $e$ from wheel $g^4$, and hold the clutch suspended between and disconnected from both the wheels $h$ and $g^4$. The outer end of the lever $h^1$ connects with the cam-spring $t$, having a V-shaped cam, constructed and operating in the same manner as the cam-spring $p^1$ and cam $v$, hereinbefore described. When the clutch $e$ is disconnected from both the wheels $h$ and $g^4$, the outer end of the lever $h^1$ is against the apex of the cam-spring $t$, and all the tools except the threading-dies continue to operate until the clutch $i$, Fig. 1, connects with wheel $i^1$, which causes the outer end of lever $i^2$ to rise and lift one end of lever $p^2$, Fig. 11, and the rod $p$, thereby forcing down the stop $x^2$ and the outer arm of lever $h^1$, Fig. 10, thus connecting the clutch $e$ with wheel $h$, and also lifting the outer arm of lever $m^4$, Fig. 1, and thereby connecting the clutch $i$ with wheel $h^2$. The lever $p^2$, Fig. 11, turns on a pin in the frame $b$, the adjustable stop $x^2$ being attached to one end, and the other end projecting over the lever $i^2$.

The construction of the chucks $a^1$ is shown in Figs. 12, 13, and 14. In the vertical section, Fig. 12, the lever $s^3$ is represented by dotted lines as having been raised by the cam $x^1$, so as to open the jaws 2 2 and permit the rod 1 to drop on the gage $s^4$. The sliding collar 6, around the spindle $d^4$, is slotted, as well as the spindle, to receive the jaws 2 2 and seats 4 4. The outer ends of the jaws converge upward, each being fitted into a recess in the seats 4 4, having the same convergence. The flange 8 on the top of the seat enters an eccentric groove in the scroll 3, the outer wall of the groove projecting downward in contact with the outer end of the seat 4, to support the outward pressure of the jaws and seats. The scroll 3 and seats 4 4 are retained in the sliding collar 6 by the face-plate 5, which is bolted to the collar. The jaws 2 2 are retained in the spindle $d^4$ by flanges on each side of them at their top, which rest in grooves in the spindle. A groove, $s^7$, is cut across each flange of the jaw 2, near its outer end. The seat 4 is slotted and grooved parallel with the outer end of the jaw 2, to fit the grooves and flange of the jaw. When the sliding collar 6, with the seats 4 4, are raised on the spindle $d^4$ by the lever $s^3$, the parts of the seats 4 4 which enter the grooves $s^7$ $s^7$ in the jaws 2 2 force open the jaws, and when the sliding collars 6 and the seats 4 4 are forced downward by the lever $s^3$, the convergent slots in the seats close the jaws 2 2 firmly against the rod 1. The jaws 2 2 are adjusted to hold different sizes of rods by turning the scroll 3 in the sliding collar 6, the seats 4 4 being moved toward and from the chuck center by means of the flange 8 in the eccentric grooves of the scroll.

The entire machine is operated as follows: The rods being manufactured into screw-bolts are held perpendicularly in the hollow spindles $d^4$ by the jaws 2 2 of the chucks $a^1$. In Figs. 1, 2, and 3 the various parts of the machine are shown in the position they occupy when the clutch $e$ has been connected with wheel $h$ long enough to move forward the carrier $a^2$. By turning the crank $b^2$ of the main shaft $c^3$, the worm $m^3$ and worm-wheel $h^2$ slowly turn the worm $h^4$, lifting the levers $i^2$ $i^3$ $i^4$. The shaft $d^1$ revolves three of the chucks $a^1$, and the shaft $g^2$ revolves the other chuck, the wheel $d^2$ turning loose on its spindle when the cam $g$ raises the lever $c^1$. The tool-holders $k$ $k$ converge, cut off, and finish the screw-bolt, which has already been milled, pointed, and threaded by the other tools. The milling-tools in holder $k^1$ mill the rod in the chuck above it. The tools in holder $k^2$ point the screw-bolt. The wheels $l$ $l^1$, screw $m$, and nut $l^2$ raise the die-holder $k^3$, and thread the screw-bolt. The outer end of lever $l^3$, and the nut $n$, Fig. 10, move downward, and when the operation of the threading-dies is finished, the nut $n$, lever $l^3$, rod $v^2$, and lever $h^1$, connect the clutch $e$ with wheel $g^4$, reversing the motion of the chuck above the threading-dies, which now withdraw from the threaded screw-bolt by the wheels $l$ and $l^1$, reversing the motion of the screw $m$, Fig. 2. The wheel $c^2$ turns back the ring $e^1$ on the carrier $a^2$ to the position shown in Fig. 6. The nut $n$ and lever $l^3$ rise and lift the rod $v^2$ and lever $h^1$, Fig. 10, disconnecting the clutch $e$ from the wheel $g^4$, and holding it disconnected from both wheels $h$ and $g^4$.

All the tools except the threading-dies continue to operate, and when their work on the rods is finished the lever $i^2$, by contact with stop $p^3$, forces down the outer end of lever $m^4$ and connects the clutch $i$ with wheel $i^1$, reversing the motion of worm $h^4$, and lowering the three levers and tool-holders connected with them till the outer end of lever $i^2$ lifts the end of lever $p^2$, Fig. 1, and the stop $p^4$, thereby shifting the clutch $i$ to the wheel $h^2$, and shifting the suspended clutch $e$ to the wheel $h$ by pressing the stop $x^2$, Fig. 11, down on the outer end of lever $h^1$, Fig. 10. This last shifting of the clutches $e$ and $i$ causes all the tools to again approach the rods in the chucks, while the wheel $c^2$ turns forward the ring $e^1$ and carrier $a^2$, with its chucks $a^1$, into their position, as shown in Figs. 1, 2, and 3. While the chuck-carrier $a^2$ is being thus moved forward the wheel $d^3$ is disconnected from the wheel $g^1$, the lever $c^1$ leaves the cam $g$, Fig. 2, and permits the clutch $a^4$ to again connect with and turn the wheel $d^2$ and the chuck. The lever $s^3$ is raised by the cam $x^1$, and forced down by the cam $x$, opening and closing the jaws of the chuck, and permitting the rod to drop on the gage $s^4$, so as to be in position to be again operated on by the milling-tools.

I claim as my invention—

1. In a screw-cutting machine, a series of rotating and revolving rod-holders, in combination with a series of tools adapted to operate simultaneously and successively upon two or more rods to perform the operations of milling, threading, and pointing the rods, or either two of such operations, substantially as described.

2. The combination, with a rotating rod-carrier and a series of rotating rod-holders supported by the carrier, of a tool to cut a screw-thread upon one rod, and a cutting-off tool to cut off a screw already formed and located at the end of another rod, both tools operating simultaneously and successively, substantially as described.

3. The combination, with a rotating head provided with a series of rotating rod-holders, of a tool to turn down the circumference of one rod, a tool to cut a screw-thread upon another rod, and a cutting-off tool to sever a threaded screw from another rod, all adapted to operate simultaneously and successively, substantially as described.

4. The ring $e^1$, having a toothed segment, with a slip-tooth, $s^6$, at each end of the segment, and its pawl $m^1$, in combination with the carrier $a^2$ and wheel $c^2$, substantially as described.

5. The carrier $a^2$, in combination with the ring $e^1$, pawl $m^1$, cam $e^2$, and stop $n^1$, substantially as described.

6. The carrier $a^2$, in combination with spindle $d^4$, wheels $d$ $d^2$, clutch $a^4$, lever $c^1$, and cam $g$, substantially as described.

7. The combination of the shaft $d^1$, wheels $d$ $d^2$ $d^3$ $g^1$, shaft $g^2$, spindle $d^4$, and clutch $a^4$, substantially as described.

8. The combination of the carrier $a^2$, ring $e^1$, pawl $m^1$, spindle $d^4$, wheels $d^3$, $g^1$, $c^2$, shaft $g^2$, and sliding box $s$, substantially as described.

9. The combination of a series of vertical rod-holders with a series of tools beneath the rods, in such manner that each tool may operate on each rod by bringing them successively in vertical line with each other to perform different steps in the formation of screws, and so that the weight of each rod, when released in its holder, will cause it to approach the tool beneath it, substantially as described.

10. In combination with the chuck for revolving the reduced and threaded rod, the chamfering-cutter, adapted to chamfer the head of the screw while the same is being severed from the rod by the cutting-off tool, substantially as described.

11. The combination of the worm $h^4$ with the wheels $e^4$ $i^1$ $a^3$, worm $m^3$, worm-wheel $h^2$, and clutch $i$, substantially as described.

12. The combination of the worm $h^4$, clutch $i$, levers $i^2$ and $m^4$, and the rod $p$ with stops $p^3$ $p^4$, springs $n^4$ $m^4$, and the cam-spring $p^1$, substantially as described.

13. The combination of lever $p^2$ with clutch $e$, wheels $h$ and $g^4$, threaded shaft $g^2$, nut $n$, lever $l^3$, rod $v^2$, spring $v^4$, collar $x^5$, lever $h^1$, and cam-spring $t$, substantially as described.

14. The combination of worm $h^4$ with the tool-holders and levers $i^2$ $p^2$ $h^1$, cam-spring $t$, clutch $e$, wheel $h$, shaft $g^2$, wheels $g^1$ $d^3$, spindle $d^4$, and chuck $a^1$, substantially as described.

15. The shaft $g^2$, in combination with the wheels $l$ $l^1$, screw $m$, nut $l^2$, holder $k^3$, wheels $g^1$ $d^3$, and spindle $d^4$, substantially as described.

16. The gage $s^4$, in combination with the chuck $a^1$, lever $s^3$, and cam $x^1$, substantially as described.

17. The sliding collar 6 and scroll-ring 3, in combination with the jaws 2 2, having convergent outer ends, and the seats 4 4, having convergent slots and grooves for the jaws to fit into, substantially as described.

LEVI W. STOCKWELL.

Witnesses:
GEORGE F. ROBINSON,
BRADFORD HOWLAND.